US011581750B2

(12) United States Patent
Zeng et al.

(10) Patent No.: US 11,581,750 B2
(45) Date of Patent: Feb. 14, 2023

(54) WIRELESS CHARGING DEVICE WITH ENHANCED CHARGING POWER AND INCREASED CHARGING SPEED

(71) Applicant: Delta Electronics (Shanghai) Co., Ltd., Shanghai (CN)

(72) Inventors: Jianhong Zeng, Shanghai (CN); Benze Zou, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 302 days.

(21) Appl. No.: 16/996,269

(22) Filed: Aug. 18, 2020

(65) Prior Publication Data

US 2021/0184476 A1 Jun. 17, 2021

(30) Foreign Application Priority Data

Dec. 17, 2019 (CN) .......................... 201911300344.3

(51) Int. Cl.
 *H01M 10/46* (2006.01)
 *H02J 7/00* (2006.01)
 (Continued)

(52) U.S. Cl.
 CPC ........ *H02J 7/0044* (2013.01); *H01F 27/2876* (2013.01); *H01F 38/14* (2013.01); *H02J 7/02* (2013.01); *H02J 50/10* (2016.02)

(58) Field of Classification Search
 CPC .......... H02J 7/0044; H02J 7/0042; H02J 7/02; H02J 50/005; H02J 50/10; H01F 27/2876; H01F 38/14; H01F 27/025
 (Continued)

(56) References Cited

U.S. PATENT DOCUMENTS 10,832,849 B2 * 11/2020 Hwang ................... H01F 27/28
2019/0215984 A1 7/2019 Pinkos et al.

FOREIGN PATENT DOCUMENTS

CN 101174168 A 5/2008
CN 104578439 A 4/2015
(Continued)

OTHER PUBLICATIONS

Han Wei et al., Research on Mathematical Model of Temperature Field of Electromagnetic Driver Drive Coil, Micromotors, Jun. 28, 2011, vol. 44, No. 6.
(Continued)

*Primary Examiner* — Edward Tso
(74) *Attorney, Agent, or Firm* — Kirton McConkie; Evan R. Witt (57) ABSTRACT

A wireless charging device includes a casing, a transmitter driving board and a transmitter coil assembly. The wireless charging device is used for charging a receiver coil of a mobile device. The transmitter driving board generates a first heat source. The transmitter driving board has a first thermal resistance. The transmitter coil assembly generates a second heat source. The transmitter coil assembly has a second thermal resistance. There is an interfacial thermal resistance between the transmitter coil assembly and the transmitter driving board. A product of a power dissipation of the second heat source and the second thermal resistance is lower than 15. The interfacial thermal resistance is higher than or equal to two times the first thermal resistance. A product of a power dissipation of the first heat source and the first thermal resistance is lower than or equal to 80.

24 Claims, 8 Drawing Sheets

(51) Int. Cl.
*H02J 50/10* (2016.01)
*H01F 27/28* (2006.01)
*H01F 38/14* (2006.01)
*H02J 7/02* (2016.01)

(58) Field of Classification Search
USPC .............................. 320/107, 108, 114, 115
See application file for complete search history.

(56) References Cited

FOREIGN PATENT DOCUMENTS

| | | | |
|---|---|---|---|
| CN | 105610208 A | | 5/2016 |
| CN | 107947304 A | | 4/2018 |
| CN | 207490618 U | | 6/2018 |
| CN | 207664718 U | * 7/2018 | ............. H02J 50/00 |
| CN | 207664718 U | | 7/2018 |
| CN | 207766038 U | | 8/2018 |
| CN | 108711917 A | | 10/2018 |
| CN | 208174370 U | | 11/2018 |
| CN | 109586365 A | | 4/2019 |
| CN | 109617152 A | | 4/2019 |
| CN | 208707367 U | | 4/2019 |
| CN | 208738898 U | | 4/2019 |
| CN | 109729689 A | | 5/2019 |
| CN | 110014911 A | | 7/2019 |
| CN | 110022004 A | | 7/2019 |
| CN | 209072105 U | | 7/2019 |
| CN | 209462039 U | | 10/2019 |
| JP | H11354959 A | | 12/1999 |
| JP | 2000216581 A | | 8/2000 |
| JP | 2006049555 A | | 2/2006 |
| JP | 2007324532 A | | 12/2007 |
| JP | 2013150393 A | | 8/2013 |
| JP | 2019030150 A | | 2/2019 |
| JP | 2019201130 A | | 11/2019 |
| KR | 20170053272 A | | 5/2017 |
| KR | 101922022 B1 | | 2/2019 |
| TW | 201421211 A | | 6/2014 |
| WO | 2018042816 A1 | | 3/2018 |
| WO | 2019017646 A1 | | 1/2019 |
| WO | 2019136692 A1 | | 7/2019 |

OTHER PUBLICATIONS

Zhang Qing et al., Design Points of Wireless Energy Transmission LED Technology, BuzhiBushi.com Inc., Sep. 30, 2016.
How to use a heat sink, http://elm-chan.org/docs/hs.html, Aug. 27, 1998.

* cited by examiner

WIRELESS CHARGING DEVICE WITH ENHANCED CHARGING POWER AND INCREASED CHARGING SPEED

CROSS-REFERENCE TO RELATED APPLICATION

This application claims priority to China Patent Application No. 201911300344.3 filed on Dec. 17, 2019, the entire contents of which are incorporated herein by reference for all purposes.

FIELD OF THE INVENTION

The present invention relates to a wireless charging device, and more particularly to a wireless charging device with enhanced charging power and increased charging speed.

BACKGROUND OF THE INVENTION

Recently, with the development of wireless charging technology, the wireless charging functions of mobile devices such as mobile phones have become more and more popular for consumers because of their own convenience. However, during the wireless charging process, both of the wireless charging device and the mobile device generate a great deal of heat. Generally, the excessively high temperature may directly affect the performance and the life of the mobile device.

Conventionally, a wireless charging device includes a transmitter coil and a transmitter driving board. The transmitter driving board receives the external electric energy to drive the transmitter coil. The mobile device includes a receiver coil. Due to an electromagnetic coupling effect between the receiver coil and the transmitter coil, the receiver coil receives the electric energy from the transmitter coil. While the mobile device is charged by the wireless charging device, the transmitter coil and the transmitter driving board in the wireless charging device and the receiver coil in the mobile device may be considered as heat sources. That is, these components have thermal resistances to the surroundings. In addition, other two thermal resistances exist between the transmitter coil and the transmitter driving board and between the transmitter coil and the receiver coil.

Generally, the heat generated by the transmitter driving board during operation is greater than the heat generated by the transmitter coil and the heat generated by the receiver coil. For achieving better charging efficacy, it is necessary to reduce the distance between the transmitter coil and the receiver coil. However, if the temperature of the mobile device exceeds a critical temperature, the charging operation is not continuously performed or the mobile device is charged at a lower power level. In other words, the temperature tolerance of the receiver coil is low. Generally, the temperature tolerance of the transmitter driving board is higher than that of the receiver coil. However, the conventional heat dissipation method only cools the transmitter driving board but ignores the receiver coil. As known, the receiver coil is more sensitive to heat because the receiver coil in the mobile device is close to the internal battery. The internal battery is a heat-sensitive component. In accordance with a conventional heat dissipation method, the thermal resistance of the transmitter coil and the thermal resistance of the transmitter driving board are increased. That is, the surface of the mobile device is the main heat dissipation path. Since a greater portion of heat flows through the mobile device, the mobile device is readily overheated. Under this circumstance, the charging power is reduced, and the charging speed is also reduced.

Therefore, there is a need of providing an improved wireless charging device in order to overcome the drawbacks of the conventional technologies.

SUMMARY OF THE INVENTION

The present invention provides a wireless charging device with enhanced charging power and increased charging speed.

In accordance with an aspect of the present invention, a wireless charging device for wirelessly charging a mobile device is provided. The mobile device includes a receiver coil. The wireless charging device includes a casing, a transmitter driving board and a transmitter coil assembly. The casing includes a top plate and an accommodation space. The mobile device is placed on the top plate. The transmitter driving board is disposed within the accommodation space for converting an external electric energy into a driving electric energy. The transmitter driving board generates a first heat source. The transmitter driving board has a first thermal resistance. The transmitter coil assembly is disposed within the accommodation space. The transmitter coil assembly receives the driving electric energy from the transmitter driving board and transfers the driving electric energy to the receiver coil according to an electromagnetic coupling effect between the transmitter coil assembly and the receiver coil. Consequently, the mobile device is wirelessly charged by the driving electric energy. The transmitter coil assembly generates a second heat source. The transmitter coil assembly has a second thermal resistance, and there is an interfacial thermal resistance between the transmitter coil assembly and the transmitter driving board. A product of a power dissipation of the second heat source and the second thermal resistance is lower than 15. The interfacial thermal resistance is higher than or equal to two times the first thermal resistance. A product of a power dissipation of the first heat source and the first thermal resistance is lower than or equal to 80. Consequently, an overall heat flow transferred from the wireless charging device to the receiver coil is lower than the power dissipation of the second heat source.

In accordance with another aspect of the present invention, a wireless charging device for wirelessly charging a mobile device is provided. The mobile device includes a receiver coil. The wireless charging device includes a casing, a transmitter driving board and a transmitter coil assembly. The casing includes a top plate, a partition plate, a bottom plate, plural lateral walls and an accommodation space. The mobile device is placed on the top plate. The partition plate is arranged between the top plate and the bottom plate. The accommodation space is divided into a first compartment and a second compartment by the partition plate. The first compartment is located beside the top plate. The second compartment is located beside the bottom plate. Moreover, plural fins are protruded externally from at least one of the plural lateral walls. The plural fins are perpendicular to the corresponding one of the plural lateral walls. The partition plate and the plural lateral walls are made of a material with high thermal conductivity. The transmitter driving board is disposed within the second compartment for converting an external electric energy into a driving electric energy. The transmitter driving board generates a first heat source. The transmitter driving board has a first thermal resistance. The transmitter coil assembly is disposed within the first compartment. The transmitter coil assembly receives the driving electric energy from the transmitter driving board and transfers the driving electric energy to the receiver coil according to an electromagnetic coupling effect between the transmitter coil assembly and the receiver coil. Consequently, the mobile device is wirelessly charged by the driving electric energy. The transmitter coil assembly generates a second heat source. The transmitter coil assembly has a second thermal resistance. There is an interfacial thermal resistance between the transmitter coil assembly and the transmitter driving board. The transmitter coil assembly is disposed on the partition plate. The sum of a length of each one of the plural fins and the average thickness of the corresponding one of the plural lateral walls is larger than or equal to two times the average thickness of the partition plate. The heat generated by the transmitter coil assembly is transferred to the plural fins through the partition plate. Moreover, an overall contact area between the bottom plate and the plural lateral walls is smaller than 5% of an overall area of the bottom plate. Consequently, an overall heat flow transferred from the wireless charging device to the receiver coil is lower than a power dissipation of the second heat source.

In accordance with another aspect of the present invention, a wireless charging device for wirelessly charging a mobile device is provided. The mobile device includes a receiver coil. The wireless charging device includes a casing, a transmitter driving board and a transmitter coil assembly. The casing includes a first top plate, a first bottom plate, plural first lateral walls and an accommodation space. The airflow-guiding cover is used for covering the casing. The airflow-guiding cover includes a second top plate, a second bottom plate and plural second lateral walls. The mobile device is supported by the second top plate. Each one of the plural second lateral walls is located beside the corresponding one of the plural first lateral walls. At least one of the plural second lateral walls has at least one airflow inlet. The second bottom plate is located beside the first bottom plate. The second bottom plate has an airflow outlet. An internal portion of the wireless charging device has an airflow channel between the at least one airflow inlet and the airflow outlet. After an airflow is fed into the at least one airflow inlet, the airflow is transferred through the airflow channel and exited from the airflow outlet. The transmitter driving board is disposed within the accommodation space for converting an external electric energy into a driving electric energy. The transmitter driving board generates a first heat source. The transmitter driving board has a first thermal resistance. The transmitter coil assembly is disposed within the accommodation space, and arranged between the first top plate and the transmitter driving board. The transmitter coil assembly receives the driving electric energy from the transmitter driving board and transfers the driving electric energy to the receiver coil according to an electromagnetic coupling effect between the transmitter coil assembly and the receiver coil. Consequently, the mobile device is wirelessly charged by the driving electric energy. The transmitter coil assembly generates a second heat source. The transmitter coil assembly has a second thermal resistance. There is an interfacial thermal resistance between the transmitter coil assembly and the transmitter driving board. An overall heat flow transferred from the wireless charging device to the receiver coil is lower than a power dissipation of the second heat source.

In accordance with another aspect of the present invention, a wireless charging device for wirelessly charging a mobile device is provided. The mobile device includes a receiver coil. The wireless charging device includes a casing, a transmitter driving board and a transmitter coil assembly. The casing includes a first top plate, a first bottom plate, plural first lateral walls and an accommodation space. The transmitter driving board is disposed within the accommodation space for converting an external electric energy into a driving electric energy. The transmitter driving board generates a first heat source. The transmitter driving board has a first thermal resistance. The transmitter coil assembly is disposed within the accommodation space, and arranged between the first top plate and the transmitter driving board. The transmitter coil assembly receives the driving electric energy from the transmitter driving board and transfers the driving electric energy to the receiver coil according to an electromagnetic coupling effect between the transmitter coil assembly and the receiver coil. Consequently, the mobile device is wirelessly charged by the driving electric energy. The transmitter coil assembly generates a second heat source. The transmitter coil assembly has a second thermal resistance. There is an interfacial thermal resistance between the transmitter coil assembly and the transmitter driving board. A width of the transmitter driving board is smaller than a largest width of the transmitter coil assembly and a length of the transmitter driving board is smaller than a largest length of the transmitter coil assembly. Consequently, an overall heat flow transferred from the wireless charging device to the receiver coil is lower than a power dissipation of the second heat source.

In accordance with another aspect of the present invention, a wireless charging device for wirelessly charging a mobile device is provided. The mobile device includes a receiver coil. The wireless charging device includes a casing, a transmitter driving board and a transmitter coil assembly. The casing includes a top plate, a bottom plate and plural lateral walls. An accommodation space is defined by the top plate, the bottom plate and the plural lateral walls collaboratively. The top plate is a printed circuit board. The transmitter driving board is disposed within the accommodation space and converts an external electric energy into a driving electric energy. The transmitter driving board generates a first heat source. The first heat source is dissipated through the bottom plate. The transmitter coil assembly is disposed within the accommodation space. The transmitter coil assembly receives the driving electric energy from the transmitter driving board and transfers the driving electric energy to the receiver coil through the top plate according to an electromagnetic coupling effect between the transmitter coil assembly and the receiver coil. Consequently, the mobile device is wirelessly charged by the driving electric energy.

In accordance with another aspect of the present invention, a wireless charging device for wirelessly charging a mobile device is provided. The mobile device includes a receiver coil. The wireless charging device includes a casing and a transmitter coil assembly. The casing includes a top plate, a partition plate and plural lateral walls. An accommodation space is defined by the top plate, the partition plate and the plural lateral walls collaboratively. The top plate is a printed circuit board. The partition plate and the plural lateral walls are integrally formed as a one-piece structure. The transmitter coil assembly is disposed within the accommodation space. The transmitter coil assembly receives a driving electric energy and transfers the driving electric energy to the receiver coil through the top plate according to an electromagnetic coupling effect between the transmitter coil assembly and the receiver coil. Consequently, the mobile device is wirelessly charged by the driving electric energy.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
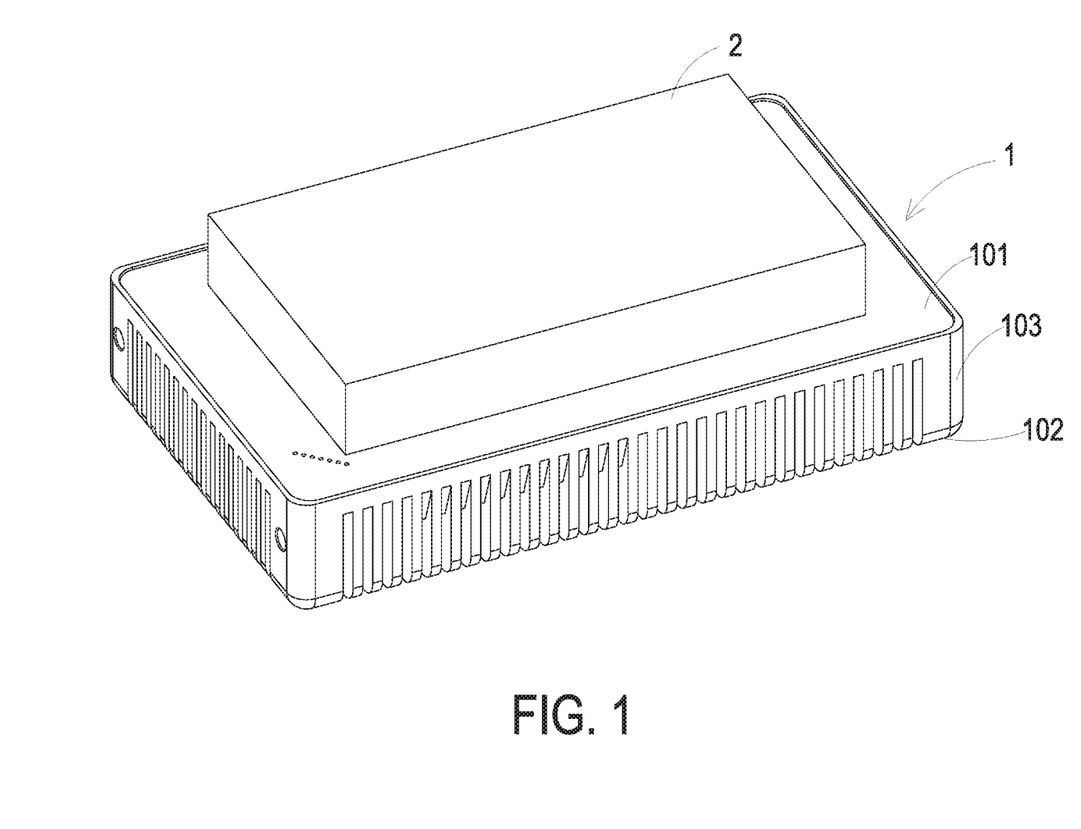
FIG. 1 is a schematic perspective view illustrating the appearance of a wireless charging device according to a first embodiment of the present invention, wherein a mobile device is placed on a top plate of the wireless charging device.
Figure 2:
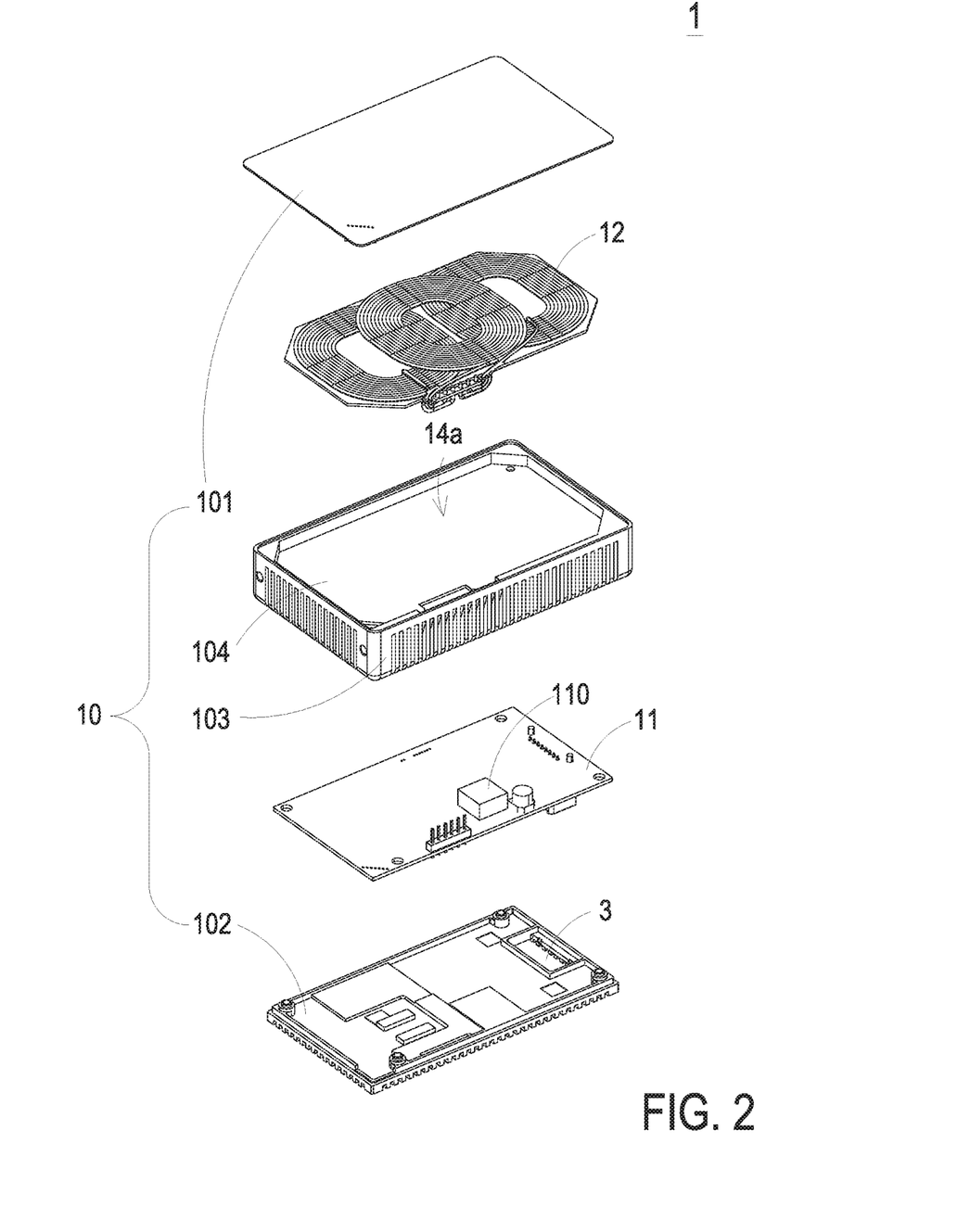
FIG. 2 is a schematic exploded view illustrating the wireless charging device as shown in FIG. 1.
Figure 3:
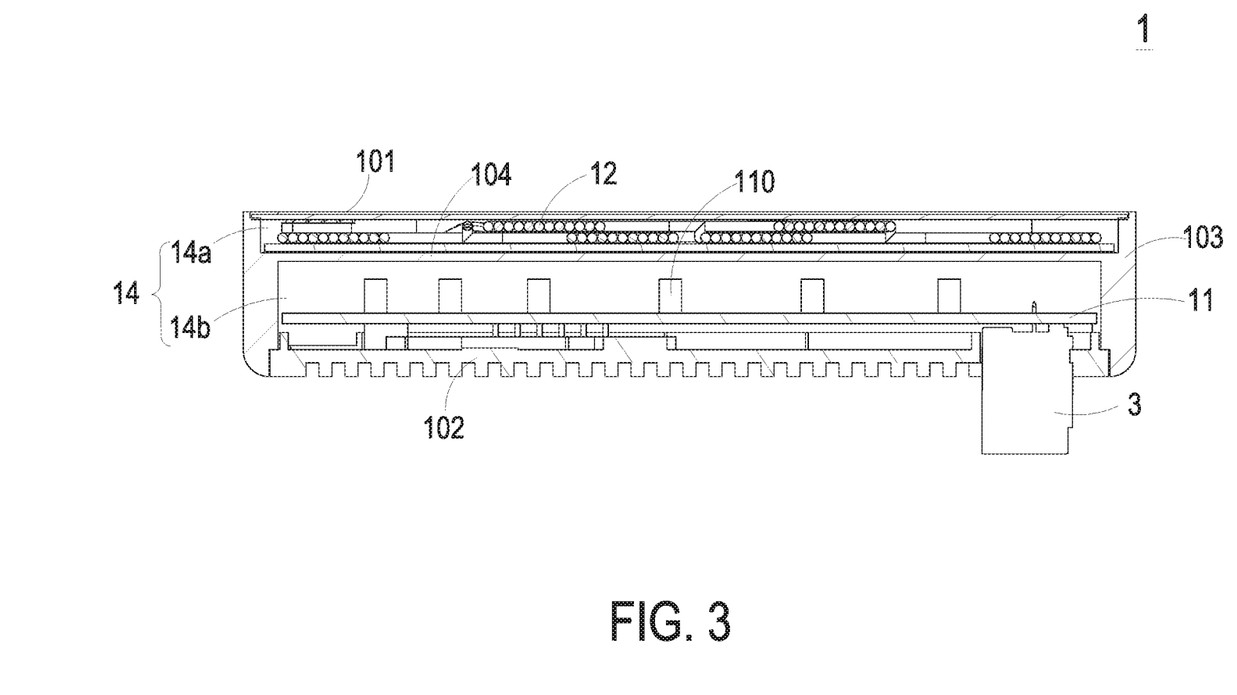
FIG. 3 is a schematic cross-sectional view illustrating the wireless charging device as shown in FIG. 1.
Figure 4:
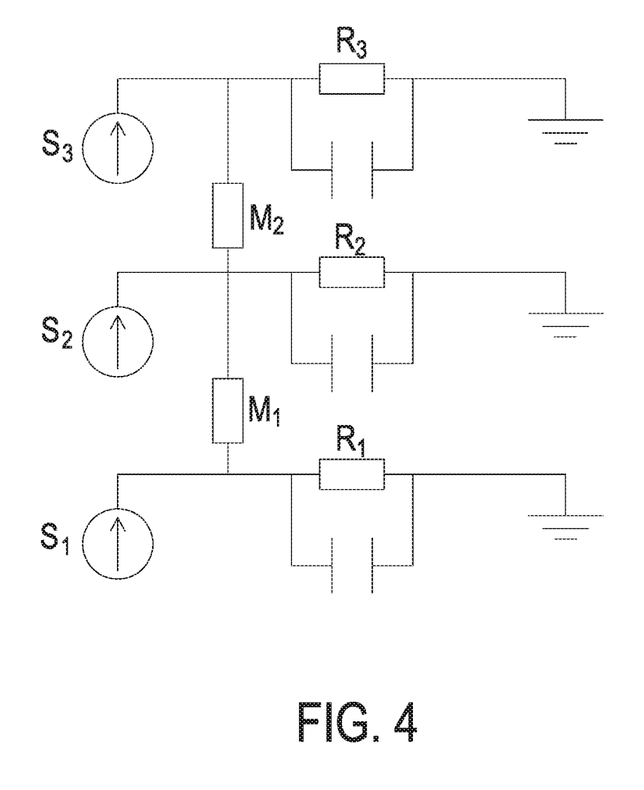
FIG. 4 is an equivalent thermal circuit of the wireless charging device as shown in FIG. 1.

Please refer to FIGS. 1, 2, 3 and 4. FIG. 1 is a schematic perspective view illustrating the appearance of a wireless charging device according to a first embodiment of the present invention, wherein a mobile device is placed on a top plate of the wireless charging device. FIG. 2 is a schematic exploded view illustrating the wireless charging device as shown in FIG. 1. FIG. 3 is a schematic cross-sectional view illustrating the wireless charging device as shown in FIG. 1. FIG. 4 is an equivalent thermal circuit of the wireless charging device as shown in FIG. 1. A mobile device 2 is supported by the wireless charging device 1. The wireless charging device 1 is used for wirelessly charging the mobile device 2. The mobile device 2 comprises a receiver coil (not shown) therein. During the operation of the receiver coil, the receiver coil generates a third heat source S3. In this embodiment, the wireless charging device 1 comprises a casing 10, a transmitter driving board 11 and a transmitter coil assembly 12.

The casing 10 comprises a top plate 101, a bottom plate 102 and plural lateral walls 103. The mobile device 2 can be placed on the top plate 101. In some embodiments, the top plate 101 is a plastic plate or a printed circuit board (PCB). Alternatively, the top plate 101 is formed by using a glue pouring process. The bottom plate 102 and the top plate 101 are opposed to each other. In some embodiments, the bottom plate 102 is made of thermally conductive material (e.g., plastic material) or the bottom plate 102 is a printed circuit board (PCB). Alternatively, the bottom plate 102 is formed by using a glue pouring process. The plural lateral walls 103 are arranged between the top plate 101 and the bottom plate 102. Moreover, an accommodation space 14 is defined by the plural lateral walls 103, the top plate 101 and the bottom plate 102 collaboratively.

The transmitter driving board 11 is disposed within the accommodation space 14 and located beside the bottom plate 102. During the operation of the transmitter driving board 11, the heat generated by the transmitter driving board 11 is dissipated to the surroundings through the bottom plate 102. Moreover, at least one electronic component 110 (e.g., MOSFET) is installed on the transmitter driving board 11. The transmitter driving board 11 is electrically connected with an external power source 3 through a perforation of the bottom plate 102. Consequently, the transmitter driving board 11 receives the external electric energy from the external power source 3. During the operation, the transmitter driving board 11 receives the external electric energy and converts the external electric energy into driving electric energy. Moreover, during the operation of the transmitter driving board 11, the transmitter driving board 11 generates a first heat source S1. The transmitter driving board 11 has a first thermal resistance R1 with respect to the surroundings.

The transmitter coil assembly 12 is disposed within the accommodation space 14 and located beside the top plate 101. The location of the transmitter coil assembly 12 is aligned with the installation location of the receiver coil of the mobile device 2 and the installation location of the transmitter driving board 11. Due to an electromagnetic coupling effect between the transmitter coil assembly 12 and the receiver coil of the mobile device 2, the transmitter coil assembly 12 receives the driving electric energy from the transmitter driving board 11 and transfers the driving electric energy to the receiver coil. Consequently, the mobile device 2 is wirelessly charged by the driving electric energy through the receiver coil. Moreover, during the operation of the transmitter coil assembly 12, the transmitter coil assembly 12 generates a second heat source S2. The transmitter coil assembly 12 has a second thermal resistance R2 with respect to the surroundings. Moreover, there is an interfacial thermal resistance M1 between the transmitter coil assembly 12 and the transmitter driving board 11.

For example, the tolerance temperature threshold value of the receiver coil of the mobile device 2 is about 40 degrees Celsius, and the ambient temperature is 25 degrees Celsius. If the temperature of the second heat source S2 generated by the transmitter coil assembly 12 can be kept lower than or equal to 40 degrees Celsius, the tendency of transferring the second heat source S2 generated by the transmitter coil assembly 12 to the receiver coil is reduced or the transmitter coil assembly 12 is helpful for removing the third heat source S3 generated by the receiver coil. Consequently, the temperature rise limit of the second heat source S2 is 15 degrees Celsius. In other words, the product of the power dissipation of the second heat source S2 and the second thermal resistance R2 needs to be lower than 15. For achieving this purpose, the second thermal resistance R2 should be as low as possible.

For increasing the heat dissipating performance of the first heat source S1 generated by the transmitter driving board 11 and reducing the tendency of transferring the first heat source S1 to the transmitter coil assembly 12 or the receiver coil, the interfacial thermal resistance M1 between the first heat source S1 and the second heat source S2 should be increased. In an embodiment, the interfacial thermal resistance M1 is higher than or equal to two times the first thermal resistance R1. Consequently, the first heat source S1 generated by the transmitter driving board 11 can be dissipated to the surroundings more easily. That is, the tendency of transferring the heat from the interfacial thermal resistance M1 to the transmitter coil assembly 12 or the receiver coil is reduced.

For example, the tolerance temperature threshold value of the electronic component 110 on the transmitter driving board 11 is about 105 degrees Celsius, and the ambient temperature is 25 degrees Celsius. For maintaining the normal operation of the electronic component 110, the temperature of the first heat source S1 generated by the transmitter driving board 11 needs to be lower than or equal to 80 degrees Celsius. Consequently, the temperature rise limit of the first heat source S1 is 80 degrees Celsius. In other words, the product of the power dissipation of the first heat source S1 and the first thermal resistance R1 needs to be lower than or equal to 80. For achieving this purpose, the first thermal resistance R1 should be as low as possible.

In other words, the wireless charging device 1 of the present invention is designed according to the following concepts. That is, the product of the power dissipation of the second heat source S2 and the second thermal resistance R2 needs to be lower than 15, the interfacial thermal resistance M1 is higher than or equal to two times the first thermal resistance R1, and the product of the power dissipation of the first heat source S1 and the first thermal resistance R1 needs to be lower than or equal to 80. Consequently, the overall heat flow transferred from the wireless charging device 1 to the receiver coil of the mobile device 2 is lower than the power dissipation of the second heat source S2. That is, the heat generated by the transmitter driving board 11 and the heat generated by the transmitter coil assembly 12 will not be transferred to the receiver coil. Especially, the heat generated by the transmitter driving board 11 and the heat generated by the transmitter coil assembly 12 are dissipated away through their heat dissipation mechanisms. In some other embodiments, the overall heat flow transferred from the wireless charging device 1 to the receiver coil of the mobile device 2 is lower than 0. Consequently, the heat generated by the receiver coil can be transferred to the transmitter coil assembly 12 and the transmitter driving board 11.

As mentioned above, the product of the power dissipation of the second heat source S2 and the second thermal resistance R2 needs to be lower than 15, the interfacial thermal resistance M1 is higher than or equal to two times the first thermal resistance R1, and the product of the power dissipation of the first heat source S1 and the first thermal resistance R1 needs to be lower than or equal to 80. Since the overall heat flow transferred from the wireless charging device 1 to the receiver coil of the mobile device 2 is lower than the power dissipation of the second heat source S2, the heat generated by the transmitter driving board 11 and the heat generated by the transmitter coil assembly 12 will not be transferred to the receiver coil. In other words, the mobile device 2 is not the main heat dissipation route of the wireless charging device 1, but the transmitter driving board 11 and the transmitter coil assembly 12 are the heat dissipation routes of the wireless charging device 1. During the operation of the wireless charging device 1, the temperature of the mobile device 2 is controlled to be under the tolerance temperature threshold value. Consequently, the charging power is enhanced, and the charging speed is increased.

In this embodiment, the casing 10 further comprises a partition plate 104. The partition plate 104 is arranged between the top plate 101 and the bottom plate 102. Preferably but not exclusively, the partition plate 104 is in parallel with the top plate 101 and the bottom plate 102. The transmitter coil assembly 12 is installed on the partition plate 104. The transmitter coil assembly 12 is arranged between the top plate 101 and the transmitter driving board 11. Moreover, the partition plate 104 is made of a material with high thermal conductivity. Consequently, the second thermal resistance R2 of the transmitter coil assembly 12 is reduced. Since the second heat source S2 generated by the transmitter coil assembly 12 can be transferred to the casing 10 through the partition plate 104, the second heat source S2 generated by the transmitter coil assembly 12 can be transferred to the surroundings more easily. In an embodiment, the partition plate 104 and the plural lateral walls 103 are integrally formed as a one-piece structure. The partition plate 104 and the lateral walls 103 are made of thermally conductive material. Consequently, the second thermal resistance R2 of the transmitter coil assembly 12 is reduced, and the second heat source S2 generated by the transmitter coil assembly 12 can be transferred to the casing 10 through the partition plate 104 more quickly.

Figure 5:
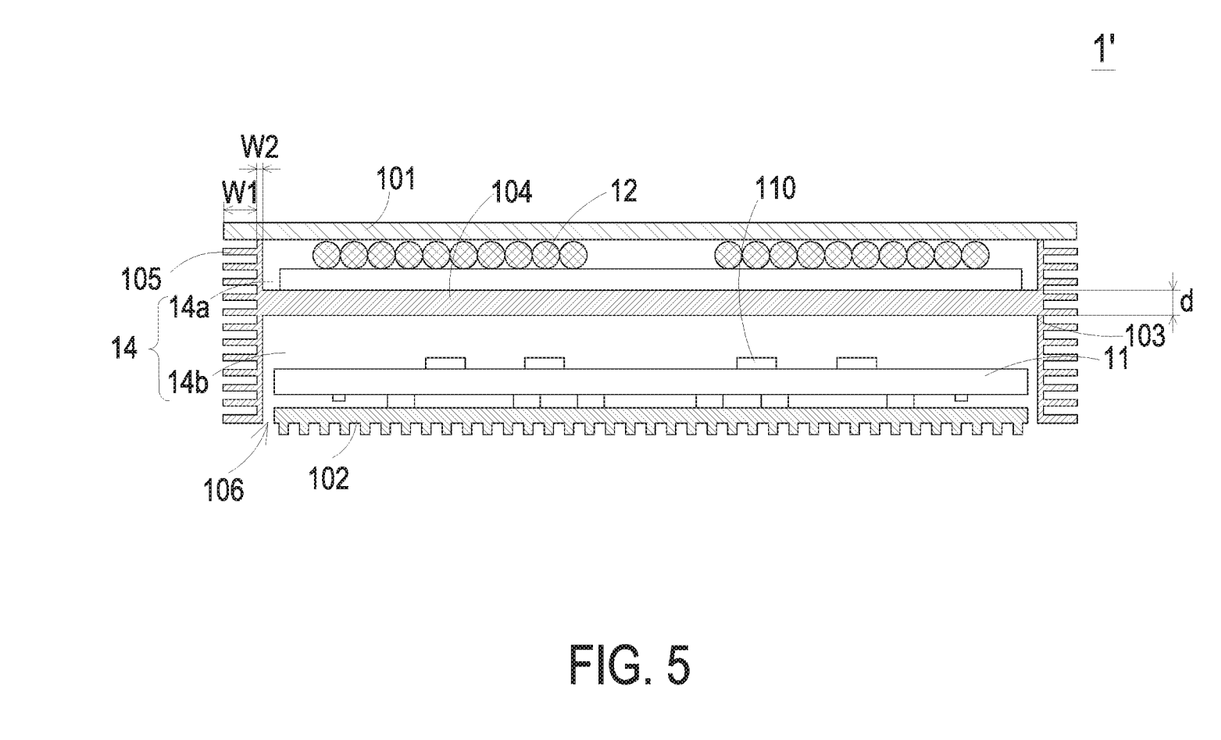
FIG. 5 is a schematic cross-sectional view illustrating a portion of a wireless charging device according to a second embodiment of the present invention.

FIG. 5 is a schematic cross-sectional view illustrating a portion of a wireless charging device according to a second embodiment of the present invention. In this embodiment, the wireless charging device 1' comprises plural fins 105. The plural fins 105 are protruded externally from at least one lateral wall 103 and perpendicular to the corresponding lateral wall 103. Due to the fins 105, the heat dissipating performance is increased. For decreasing the second thermal resistance R2, the areas of the plural fins 105 are increased. The plural fins 105 are acted as heat dissipating surfaces. In an embodiment, the sum of the length W1 of the fin 105 and the average thickness W2 of the corresponding lateral wall 103 is larger than or equal to two times the average thickness d of the partition plate 104. Since the arrangement of the fins 105 can increase the heat dissipating performance, the thickness of the partition plate 104 may be reduced. In some embodiments, as shown in FIG. 5, plural fins are protruded externally from the bottom plate 102.

In an embodiment, the partition plate 104 and the plural lateral walls 103 are not integrally formed as a one-piece structure. Under this circumstance, the partition plate 104 and the plural lateral walls 103 are bonded together through an adhesive with high thermal conductivity. Since the partition plate 104 and the plural lateral walls 103 are made of thermally conductive material, the second heat source S2 generated by the transmitter coil assembly 12 can be transferred to the plural fins 105 through the partition plate 104.

In an embodiment, the interfacial thermal resistance M1 between the transmitter coil assembly 12 and the transmitter driving board 11 is increased. Consequently, the first heat source S1 generated by the transmitter driving board 11 is not transferred to the transmitter coil assembly 12 through the interfacial thermal resistance M1. For example, the transmitter driving board 11 is installed on the bottom plate 102. Moreover, the overall contact area between the bottom plate 102 and the plural lateral walls 103 is smaller than 5% of the overall area of the bottom plate 102. Consequently, the interfacial thermal resistance M1 between the transmitter coil assembly 12 and the transmitter driving board 11 is increased.

In the embodiment of FIG. 5, there is a gap 106 between the bottom plate 102 and the corresponding lateral wall 103. That is, the bottom plate 102 is not in direct contact with the lateral wall 103. Moreover, an electromagnetic absorber material (not shown) is interposed into the gap 106. The electromagnetic absorber material is connected with the bottom plate 102 and the lateral wall 103. The electromagnetic absorber material has lower thermal conductivity. Consequently, the interfacial thermal resistance M1 between the transmitter coil assembly 12 and the transmitter driving board 11 is largely increased. In other words, a greater portion of the heat generated by the transmitter driving board 11 is dissipated away through the bottom plate 102, and a smaller portion of the heat generated by the transmitter driving board 11 is transferred to the transmitter coil assembly 12.

Moreover, the accommodation space 14 is divided into a first compartment 14a and a second compartment 14b by the partition plate 104. The first compartment 14a is located beside the top plate 101. The transmitter coil assembly 12 is disposed within the first compartment 14a. The second compartment 14b is located beside the bottom plate 102. The transmitter driving board 11 is disposed within the second compartment 14b.

In some embodiment, a gluing material (e.g., a thermal conductive glue) is filled in the first compartment 14a between the top plate 101 and the partition plate 104. Consequently, the structural strength and the heat conduction performance of the casing 10 are enhanced. Under this circumstance, the top plate 101 with a reduced thickness is feasible. Consequently, the thermal resistance of the casing 10 is reduced, and the overall thickness of the wireless charging device 1' is reduced.

For example, the second heat source S2 generated by the transmitter coil assembly 12 is at a power level of 0.6 W, the first heat source S1 generated by the transmitter driving board 11 is at a power level of 3.6 W, the thickness of the partition plate 104 is 1 mm, and the average length of the fin 105 is 5 mm. According to the following formulae (1) and (2), the second thermal resistance R2 is 4.2° C./W, the first thermal resistance R1 is 15.8° C./W, and the interfacial thermal resistance M1 is 28° C./W. It is noted that these parameters are not restricted.

$$R = \frac{1}{\partial A} \quad (1)$$

$$R = \frac{\delta}{\lambda A} \quad (2)$$

In the above formulae, $\partial$ is a heat transfer coefficient, A is a heat transfer area, $\delta$ is a distance and $\lambda$ is a thermal conductivity.

Figure 6:
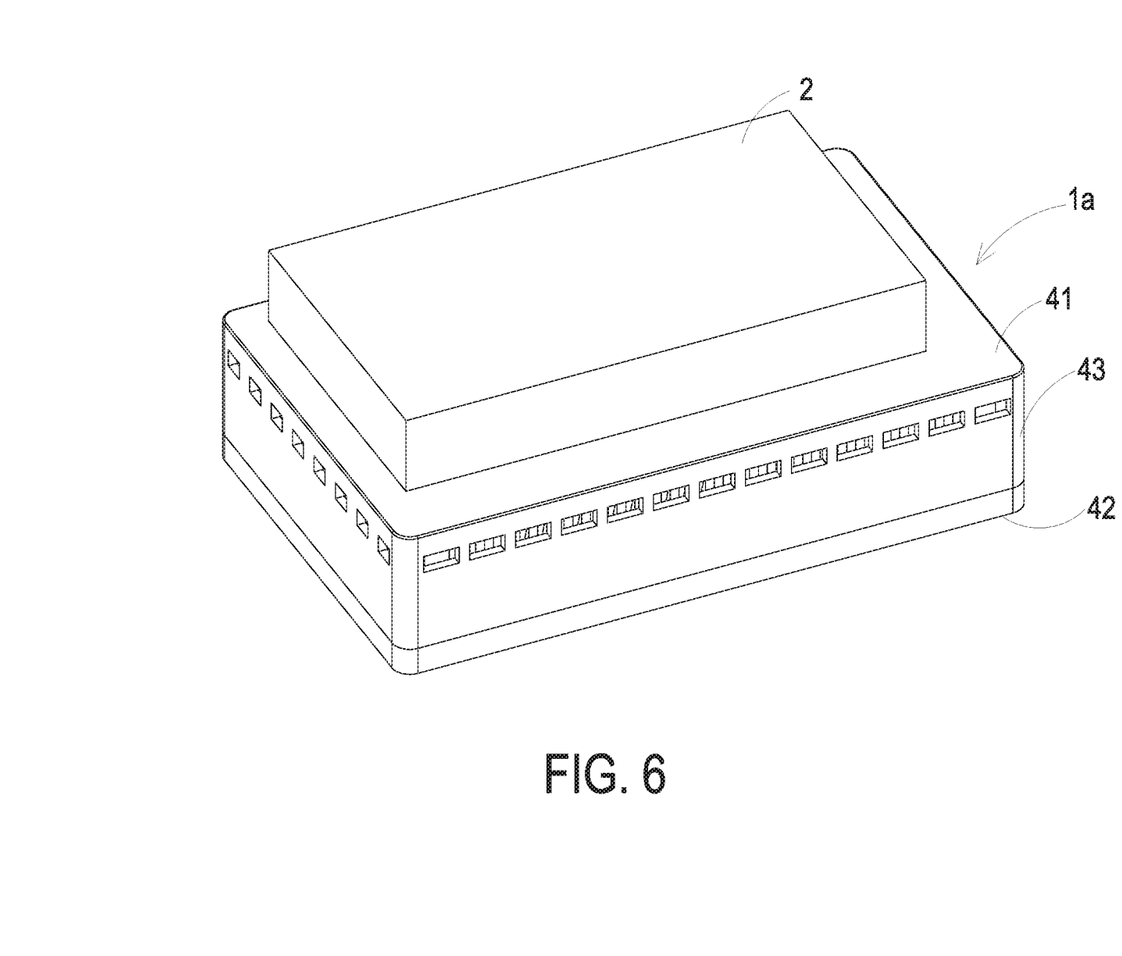
FIG. 6 is a schematic perspective view illustrating the appearance of a wireless charging device according to a third embodiment of the present invention, wherein a mobile device is placed on a top plate of the wireless charging device.
Figure 7:
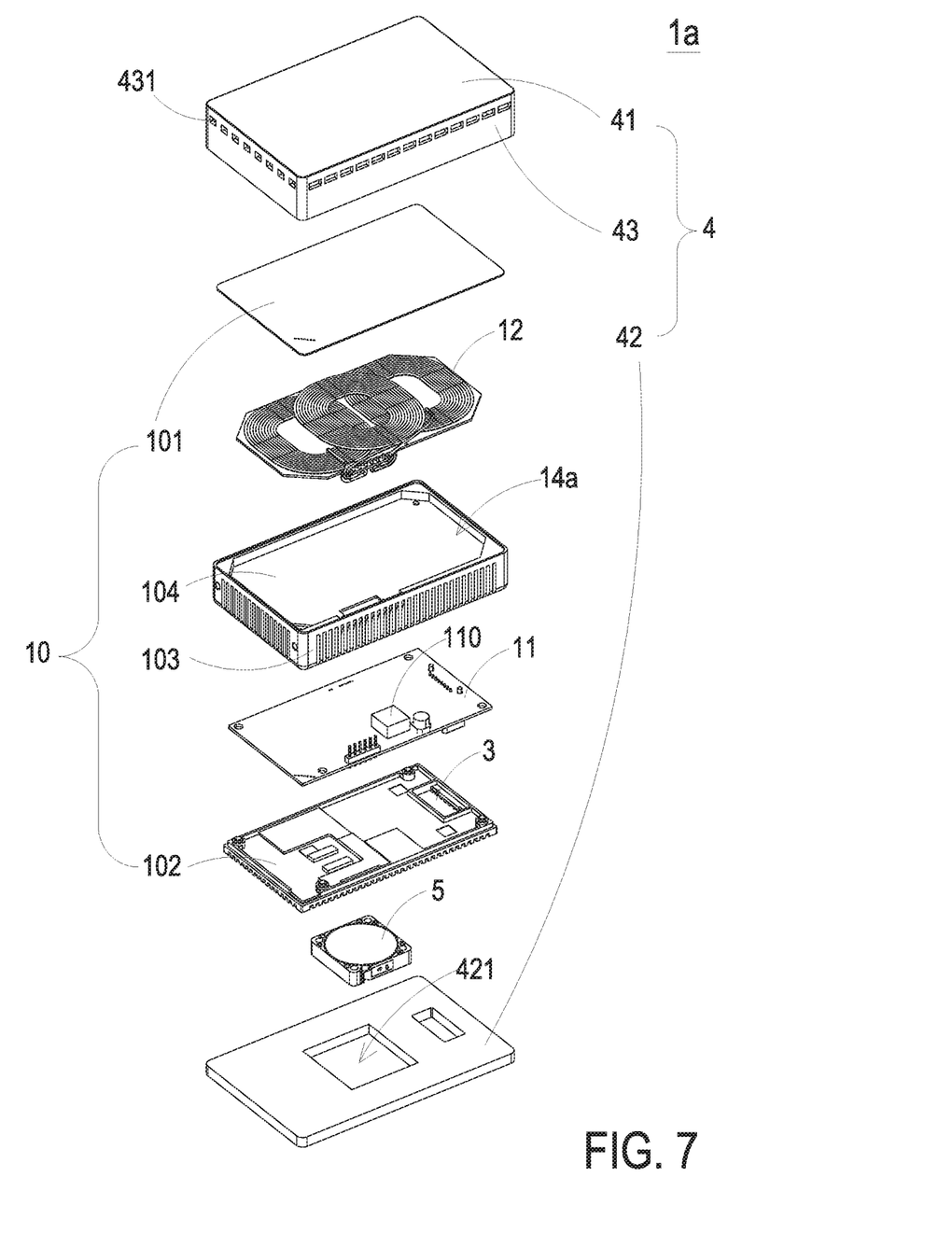
FIG. 7 is a schematic exploded view illustrating the wireless charging device as shown in FIG. 6.
Figure 8:
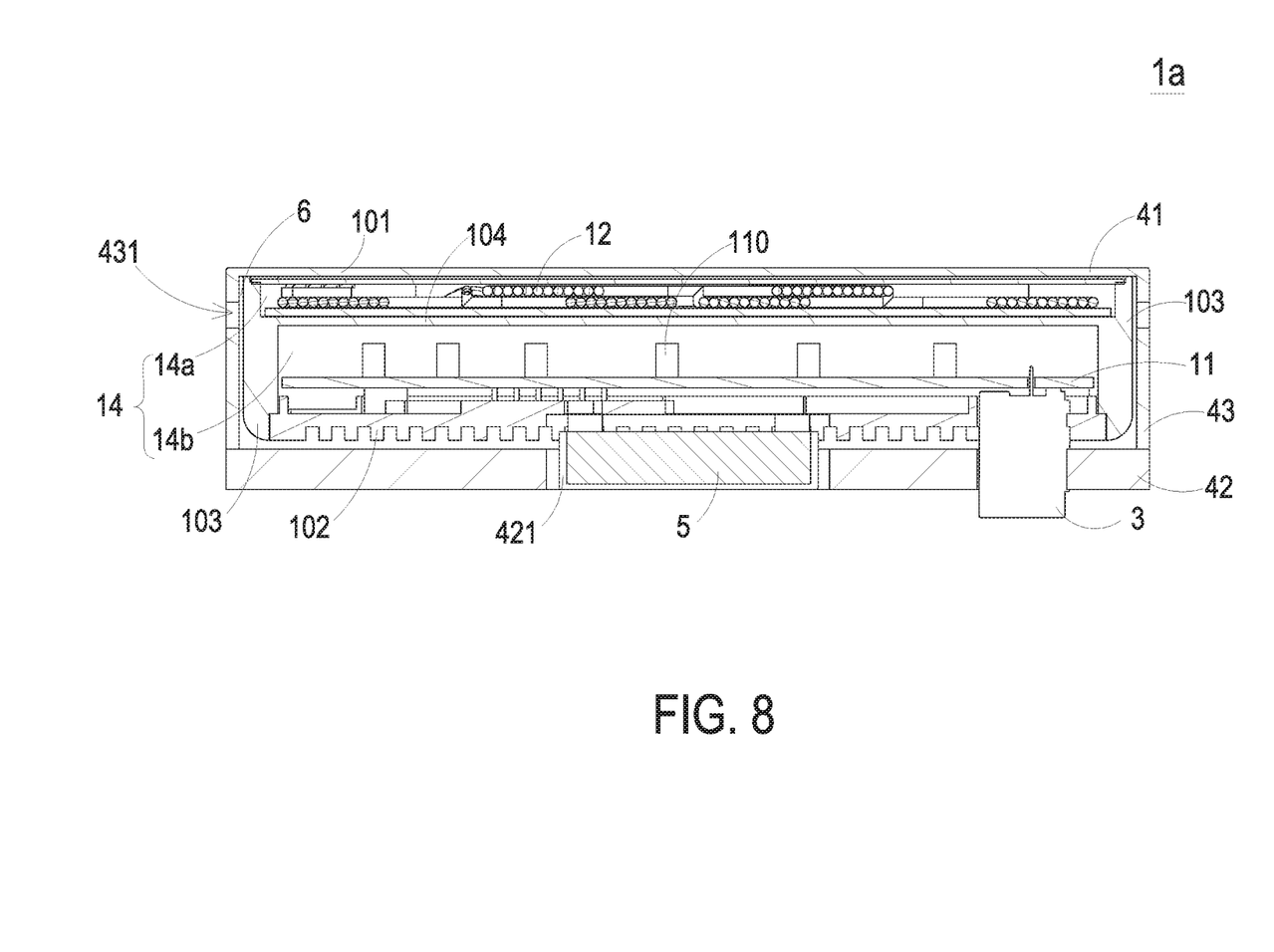
FIG. 8 is a schematic cross-sectional view illustrating the wireless charging device as shown in FIG. 6.

Please refer to FIGS. 6, 7 and 8. FIG. 6 is a schematic perspective view illustrating the appearance of a wireless charging device according to a third embodiment of the present invention, wherein a mobile device is placed on a top plate of the wireless charging device. FIG. 7 is a schematic exploded view illustrating the wireless charging device as shown in FIG. 6. FIG. 8 is a schematic cross-sectional view illustrating the wireless charging device as shown in FIG. 6. Component parts and elements corresponding to those of the first embodiment are designated by identical numeral references, and detailed descriptions thereof are omitted.

The wireless charging device 1a of this embodiment uses a large-power wireless charging technology. The wireless charging device 1a also comprises a casing 10, a transmitter driving board 11 and a transmitter coil assembly 12. In comparison with the first embodiment, the wireless charging device 1a further comprises an airflow-guiding cover 4 for covering the casing 10.

The airflow-guiding cover 4 comprises a top plate 41, a bottom plate 42 and plural lateral walls 43. The airflow-guiding cover 4 is a single component. In an embodiment, the airflow-guiding cover 4 is constituted by a space receiving the wireless charging device 1a. A mobile device 2 is supported by the top plate 41 of the airflow-guiding cover 4. The top plate 41 of the airflow-guiding cover 4 is located beside the top plate 101 of the casing 10. The lateral walls 43 of the airflow-guiding cover 4 are located beside the corresponding lateral walls 103 of the casing 10. At least one of the lateral walls 43 of the airflow-guiding cover 4 has at least one airflow inlet 431. The airflow inlet 431 is located beside the top plate 41 of the airflow-guiding cover 4 and the top plate 101 of the casing 10. The ambient airflow can be introduced into the airflow-guiding cover 4 through the airflow inlet 431 in order to cool down the lateral walls 103 of the casing 10. The bottom plate 42 of the airflow-guiding cover 4 is located beside the bottom plate 102 of the casing 10. The bottom plate 42 of the airflow-guiding cover 4 has an airflow outlet 421. The internal portion of the wireless charging device 1a has an airflow channel 6 between the at least one airflow inlet 431 and the airflow outlet 421. After the ambient airflow is fed into the airflow inlet 431, the airflow is transferred through the airflow channel 6 and exited from the airflow outlet 421. Consequently, the bottom plate 102 of the casing 10 is cooled down by the airflow, and the second thermal resistance R2 is reduced. That is, the heat generated by the transmitter coil assembly 12 is dissipated to the surroundings more easily. In other words, the temperature of the airflow exited from the airflow outlet 421 is higher than the temperature of the airflow fed into the airflow inlet 431.

In this embodiment, the airflow-guiding cover 4 comprises plural airflow inlets 431 and one airflow outlet 421. The plural airflow inlets 431 are uniformly distributed in the lateral walls 43 of the airflow-guiding cover 4. Preferably, the overall cross section area of the airflow inlets 431 is larger than or equal to 1.2 times the overall cross section area of the airflow outlet 421. Consequently, the flowrate of the airflow is increased. It is noted that numerous modifications and alterations may be made while retaining the teachings of the invention. For example, in another embodiment, the airflow-guiding cover 4 comprises one airflow inlet 431.

For reducing the tendency of transferring the second heat source S2 of the transmitter coil assembly 12 to the receiver coil of the mobile device 2, it is necessary to reduce the second thermal resistance R2 with respect to the surroundings. Consequently, the heat generated by the transmitter coil assembly 12 can be directly dissipated to the surroundings. In case that the average thickness of the lateral wall 103 of the casing 10 is increased, the second thermal resistance R2 can be reduced. However, the increase of the average thickness of the lateral wall 103 may increase the overall size of the wireless charging device 1a. Consequently, it is necessary to reduce the size of the transmitter driving board 11. Generally, the overall size of the wireless charging device 1a is related to the size of the transmitter coil assembly 12. For reducing the size of the transmitter driving board 11, the width of the transmitter driving board 11 needs to be smaller than the largest width of the transmitter coil assembly 12 and/or the length of the transmitter driving board 11 needs to be smaller than the largest length of the transmitter coil assembly 12.

Please refer to FIGS. 6, 7 and 8 again. The airflow outlet 421 is formed between the bottom plate 42 of the airflow-guiding cover 4 and the bottom plate 102 of the casing 10. The airflow outlet 421 is in communication with the airflow channel 6. In an embodiment, the wireless charging device 1a further comprises a fan 5. The fan 5 is accommodated within the airflow outlet 421. During the operation of the fan 5, the airflow is inhaled into the airflow channel 6 and exited from the airflow outlet 421 more quickly. Consequently, the heat dissipating performance of the wireless charging device 1a is enhanced.

In an embodiment, the fan 5 has an enclosure (not shown). The distance between the enclosure and the bottom plate 102 of the casing 10 is smaller than or equal to 0.05 mm, and/or a material with high thermal conductivity is interposed into the gap between the enclosure and the bottom plate 102 of the casing 10. Under this circumstance, the thermal resistance between the enclosure and the bottom plate 102 of the casing 10 is reduced. Consequently, the heat generated by the bottom plate 102 of the casing 10 can be transferred to the enclosure and dissipated away by the airflow that is driven by the fan 5. It is noted that numerous modifications and alterations may be made while retaining the teachings of the invention. For example, in another embodiment, the fan 5 is not equipped with the enclosure, which can also reduce the thermal resistance between the fan 5 and the bottom plate 102 of the casing 10.

For example, the second heat source S2 generated by the transmitter coil assembly 12 is at a power level of 0.6 W, the first heat source S1 generated by the transmitter driving board 11 is at a power level of 3.6 W, the thickness of the partition plate 104 is 1 mm, and the average length of the fin 105 is 5 mm. According to the following formulae (1) and (2), the second thermal resistance R2 is 3.9° C./W, the first thermal resistance R1 is 17° C./W, and the interfacial thermal resistance M1 is 31° C./W. It is noted that these parameters are not restricted.

$$R = 1/\partial A \quad (1)$$

$$R = \delta/\lambda A \quad (2)$$

In the above formulae, $\partial$ is a heat transfer coefficient, A is a heat transfer area, $\delta$ is a distance and $\lambda$ is a thermal conductivity.

From the above descriptions, the present invention provides the wireless charging device for charging the mobile device. The product of the power dissipation of the second heat source and the second thermal resistance needs to be lower than 15. The interfacial thermal resistance is higher than or equal to two times the first thermal resistance. The product of the power dissipation of the first heat source and the first thermal resistance needs to be lower than or equal to 80. Since the overall heat flow transferred from the wireless charging device to the receiver coil of the mobile device is lower than the power dissipation of the second heat source, the heat generated by the transmitter driving board and the heat generated by the transmitter coil assembly will not be transferred to the receiver coil. In other words, the mobile device is not the main heat dissipation route of the wireless charging device, but the transmitter driving board 11 and the transmitter coil assembly 12 are the heat dissipation routes of the wireless charging device. During the operation of the wireless charging device, the temperature of the mobile device is controlled to be under the tolerance temperature threshold value. Consequently, the charging power is enhanced, and the charging speed is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging device for wirelessly charging a mobile device, the mobile device comprising a receiver coil, the wireless charging device comprising:

a casing comprising a top plate and an accommodation space, wherein the mobile device is placed on the top plate;

a transmitter driving board disposed within the accommodation space, and converting an external electric energy into a driving electric energy, wherein the transmitter driving board generates a first heat source, the transmitter driving board has a first thermal resistance; and a transmitter coil assembly disposed within the accommodation space, wherein the transmitter coil assembly receives the driving electric energy from the transmitter driving board and transfers the driving electric energy to the receiver coil according to an electromagnetic coupling effect between the transmitter coil assembly and the receiver coil, so that the mobile device is wirelessly charged by the driving electric energy, wherein the transmitter coil assembly generates a second heat source, the transmitter coil assembly has a second thermal resistance, and there is an interfacial thermal resistance between the transmitter coil assembly and the transmitter driving board, wherein a product of a power dissipation of the second heat source and the second thermal resistance is lower than 15, the interfacial thermal resistance is higher than or equal to two times the first thermal resistance, and a product of a power dissipation of the first heat source and the first thermal resistance is lower than or equal to 80, so that an overall heat flow transferred from the wireless charging device to the receiver coil is lower than the power dissipation of the second heat source.

2. The wireless charging device according to claim 1, wherein the casing further comprises a bottom plate, a partition plate and plural lateral walls, wherein the partition plate is arranged between the top plate and the bottom plate, plural fins are protruded externally from at least one of the plural lateral walls, and each one of the plural fins is perpendicular to the corresponding one of the plural lateral walls.

3. The wireless charging device according to claim 2, wherein the sum of a length of each one of the plural fins and the average thickness of the corresponding one of the plural lateral walls is larger than or equal to two times the average thickness of the partition plate.

4. The wireless charging device according to claim 2, wherein the transmitter coil assembly is disposed on the partition plate, and arranged between the top plate and the transmitter driving board, wherein the partition plate and the plural lateral walls are integrally formed as a one-piece structure, or the partition plate and the plural lateral walls are bonded together through an adhesive with high thermal conductivity, wherein the partition plate and the plural lateral walls are made of thermally conductive material, and the heat generated by the transmitter coil assembly is transferred to the plural fins through the partition plate.

5. The wireless charging device according to claim 2, wherein an overall contact area between the bottom plate and the plural lateral walls is smaller than 5% of an overall area of the bottom plate.

6. The wireless charging device according to claim 2, wherein the bottom plate is made of a thermally conductive material, and the heat generated by the transmitter driving board is dissipated to surroundings through the bottom plate.

7. The wireless charging device according to claim 2, wherein there is a gap between the bottom plate and the corresponding one of the plural lateral walls, so that the bottom plate is not in direct contact with the plural lateral walls, wherein an electromagnetic absorber material is interposed into the gap and connected with the bottom plate and the plural lateral walls, and the electromagnetic absorber material has low thermal conductivity.

8. The wireless charging device according to claim 2, wherein a gluing material is filled in a space between the top plate and the partition plate.

9. The wireless charging device according to claim 1, wherein the top plate is a plastic plate or a printed circuit board.

10. The wireless charging device according to claim 1, wherein the overall heat flow transferred from the wireless charging device to the receiver coil is lower than 0.

11. A wireless charging device for wirelessly charging a mobile device, the mobile device comprising a receiver coil, the wireless charging device comprising:
a casing comprising a top plate, a partition plate, a bottom plate, plural lateral walls and an accommodation space, wherein the mobile device is placed on the top plate, the partition plate is arranged between the top plate and the bottom plate, the accommodation space is divided into a first compartment and a second compartment by the partition plate, the first compartment is located beside the top plate, the second compartment is located beside the bottom plate, plural fins are protruded externally from at least one of the plural lateral walls, and the plural fins are perpendicular to the corresponding one of the plural lateral walls, wherein the partition plate and the plural lateral walls are made of a material with high thermal conductivity;
a transmitter driving board disposed within the second compartment, and converting an external electric energy into a driving electric energy, wherein the transmitter driving board generates a first heat source, the transmitter driving board has a first thermal resistance; and
a transmitter coil assembly disposed within the first compartment, wherein the transmitter coil assembly receives the driving electric energy from the transmitter driving board and transfers the driving electric energy to the receiver coil according to an electromagnetic coupling effect between the transmitter coil assembly and the receiver coil, so that the mobile device is wirelessly charged by the driving electric energy, wherein the transmitter coil assembly generates a second heat source, the transmitter coil assembly has a second thermal resistance, and there is an interfacial thermal resistance between the transmitter coil assembly and the transmitter driving board,
wherein the transmitter coil assembly is disposed on the partition plate, the sum of a length of each one of the plural fins and the average thickness of the corresponding one of the plural lateral walls is larger than or equal to two times the average thickness of the partition plate, the heat generated by the transmitter coil assembly is transferred to the plural fins through the partition plate, and an overall contact area between the bottom plate and the plural lateral walls is smaller than 5% of an overall area of the bottom plate, so that an overall heat flow transferred from the wireless charging device to the receiver coil is lower than a power dissipation of the second heat source.

12. The wireless charging device according to claim 11, wherein the partition plate and the plural lateral walls are integrally formed as a one-piece structure, or the partition plate and the plural lateral walls are bonded together through an adhesive with high thermal conductivity, wherein the partition plate and the plural lateral walls are made of thermally conductive material.

13. A wireless charging device for wirelessly charging a mobile device, the mobile device comprising a receiver coil, the wireless charging device comprising:
a casing comprising a first top plate, a first bottom plate, plural first lateral walls and an accommodation space;
an airflow-guiding cover for covering the casing, wherein the airflow-guiding cover comprises a second top plate, a second bottom plate and plural second lateral walls, wherein the mobile device is supported by the second top plate, each one of the plural second lateral walls is located beside the corresponding one of the plural first lateral walls, at least one of the plural second lateral walls has at least one airflow inlet, the second bottom plate is located beside the first bottom plate, the second bottom plate has an airflow outlet, and an internal portion of the wireless charging device has an airflow channel between the at least one airflow inlet and the airflow outlet, wherein after an airflow is fed into the at least one airflow inlet, the airflow is transferred through the airflow channel and exited from the airflow outlet;
a transmitter driving board disposed within the accommodation space, and converting an external electric energy into a driving electric energy, wherein the transmitter driving board generates a first heat source, the transmitter driving board has a first thermal resistance; and
a transmitter coil assembly disposed within the accommodation space, and arranged between the first top plate and the transmitter driving board, wherein the transmitter coil assembly receives the driving electric energy from the transmitter driving board and transfers the driving electric energy to the receiver coil according to an electromagnetic coupling effect between the transmitter coil assembly and the receiver coil, so that the mobile device is wirelessly charged by the driving electric energy, wherein the transmitter coil assembly generates a second heat source, the transmitter coil assembly has a second thermal resistance, and there is an interfacial thermal resistance between the transmitter coil assembly and the transmitter driving board,
wherein an overall heat flow transferred from the wireless charging device to the receiver coil is lower than a power dissipation of the second heat source.

14. The wireless charging device according to claim 13, wherein the at least one airflow inlet is located beside the first top plate, and an overall cross section area of the at least one airflow inlet is larger than or equal to 1.2 times an overall cross section area of the airflow outlet.

15. The wireless charging device according to claim 13, wherein a width of the transmitter driving board is smaller than a largest width of the transmitter coil assembly, and/or a length of the transmitter driving board is smaller than a largest length of the transmitter coil assembly.

16. The wireless charging device according to claim 13, wherein the airflow outlet is formed between the first bottom plate and the second bottom plate, and the wireless charging device further comprises a fan, wherein the fan is accommodated within the airflow outlet, and is used for heat dissipation of the wireless charging device.

17. The wireless charging device according to claim 16, wherein the fan has an enclosure, and a distance between the enclosure and the first bottom plate is smaller than or equal to 0.5 mm.

18. The wireless charging device according to claim 17, wherein a material with high thermal conductivity is interposed into a gap between the enclosure and the first bottom plate.

19. The wireless charging device according to claim 13, wherein plural fins are protruded externally from at least one of the plural first lateral walls, and each one of the plural fins is perpendicular to the corresponding one of the plural first lateral walls.

20. The wireless charging device according to claim 19, wherein the casing further comprises a partition plate, and the partition plate is arranged between the first top plate and the first bottom plate, wherein the sum of a length of each one of the plural fins and the average thickness of the corresponding one of the plural first lateral walls is larger than or equal to two times the average thickness of the partition plate.

21. The wireless charging device according to claim 13, wherein the casing further comprises a partition plate, and the partition plate is arranged between the first top plate and the first bottom plate, wherein the partition plate is made of thermally conductive material, and the transmitter coil assembly is disposed on the partition plate, wherein the partition plate and the plural first lateral walls are integrally formed as a one-piece structure, or the partition plate and the plural first lateral walls are bonded together through an adhesive with high thermal conductivity.

22. The wireless charging device according to claim 13, wherein a product of a power dissipation of the second heat source and the second thermal resistance is lower than 15, the interfacial thermal resistance is higher than or equal to two times the first thermal resistance, and a product of a power dissipation of the first heat source and the first thermal resistance is lower than or equal to 80.

23. A wireless charging device for wirelessly charging a mobile device, the mobile device comprising a receiver coil, the wireless charging device comprising:
  a casing comprising a first top plate, a first bottom plate, plural first lateral walls and an accommodation space;
  a transmitter driving board disposed within the accommodation space, and converting an external electric energy into a driving electric energy, wherein the transmitter driving board generates a first heat source, the transmitter driving board has a first thermal resistance; and
  a transmitter coil assembly disposed within the accommodation space, and arranged between the first top plate and the transmitter driving board, wherein the transmitter coil assembly receives the driving electric energy from the transmitter driving board and transfers the driving electric energy to the receiver coil according to an electromagnetic coupling effect between the transmitter coil assembly and the receiver coil, so that the mobile device is wirelessly charged by the driving electric energy, wherein the transmitter coil assembly generates a second heat source, the transmitter coil assembly has a second thermal resistance, and there is an interfacial thermal resistance between the transmitter coil assembly and the transmitter driving board,
  wherein a width of the transmitter driving board is smaller than a largest width of the transmitter coil assembly and a length of the transmitter driving board is smaller than a largest length of the transmitter coil assembly, so that an overall heat flow transferred from the wireless charging device to the receiver coil is lower than a power dissipation of the second heat source.

24. The wireless charging device according to claim 23, wherein the wireless charging device further comprises an airflow-guiding cover for covering the casing, wherein the airflow-guiding cover comprises a second top plate, a second bottom plate and plural second lateral walls, wherein the mobile device is supported by the second top plate, each one of the plural second lateral walls is located beside the corresponding one of the plural first lateral walls, at least one of the plural second lateral walls has at least one airflow inlet, the second bottom plate is located beside the first bottom plate, the second bottom plate has an airflow outlet, and an internal portion of the wireless charging device has an airflow channel between the at least one airflow inlet and the airflow outlet, wherein after an airflow is fed into the airflow inlet, the airflow is transferred through the airflow channel and exited from the airflow outlet.

* * * * *